Figure 12:
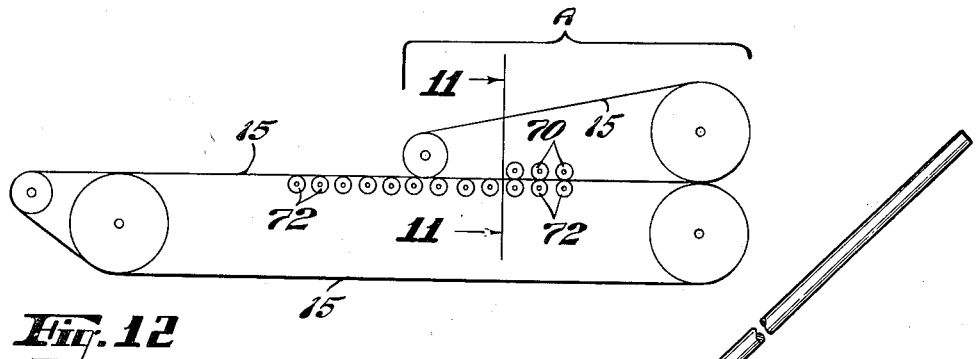

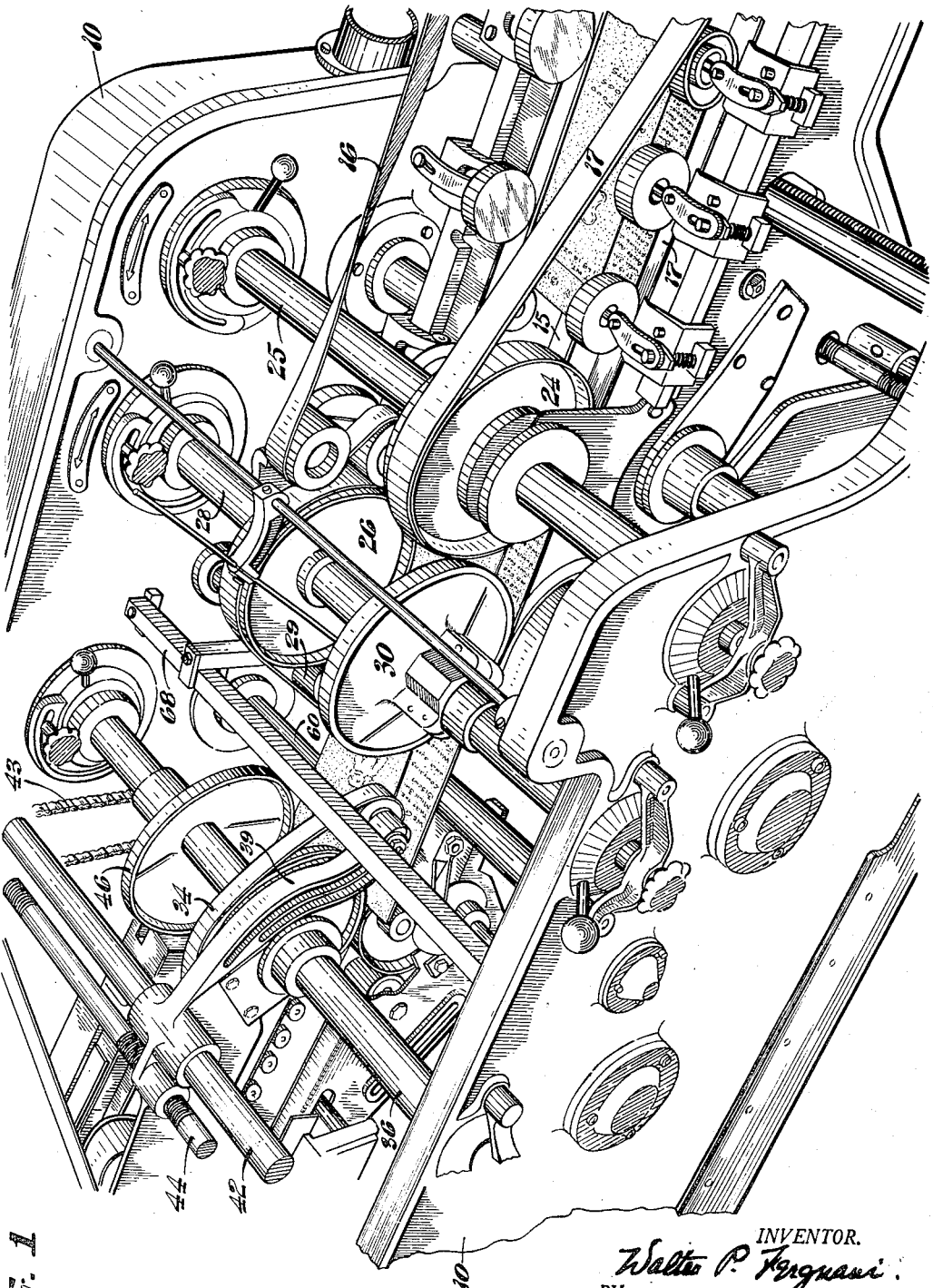

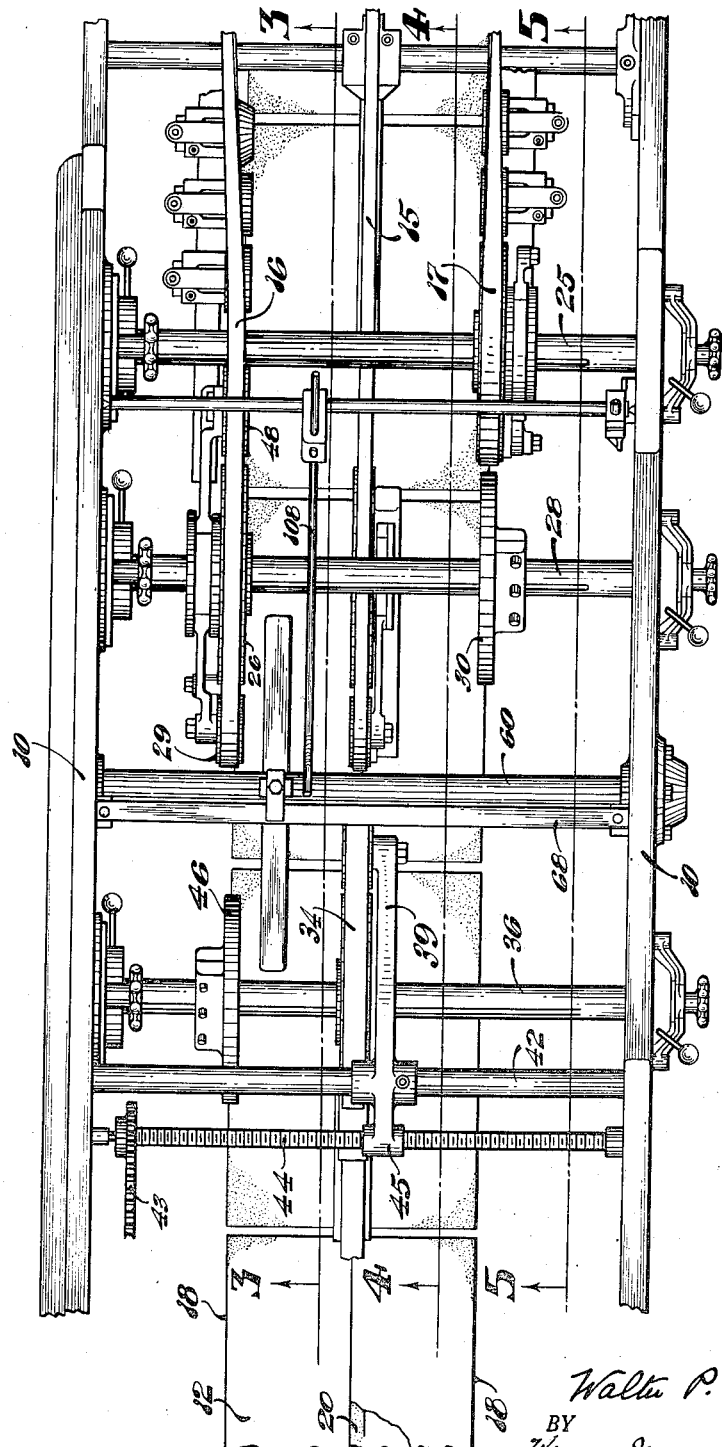

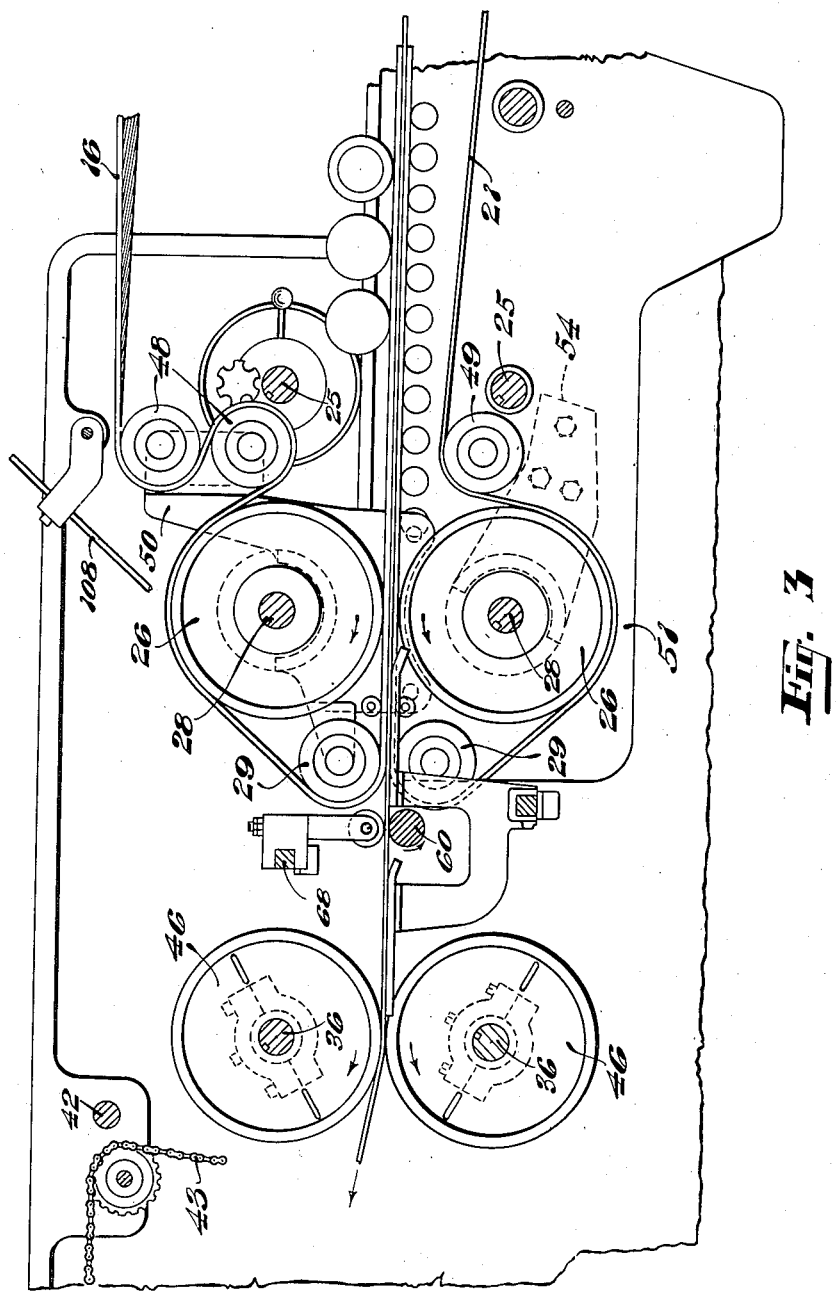

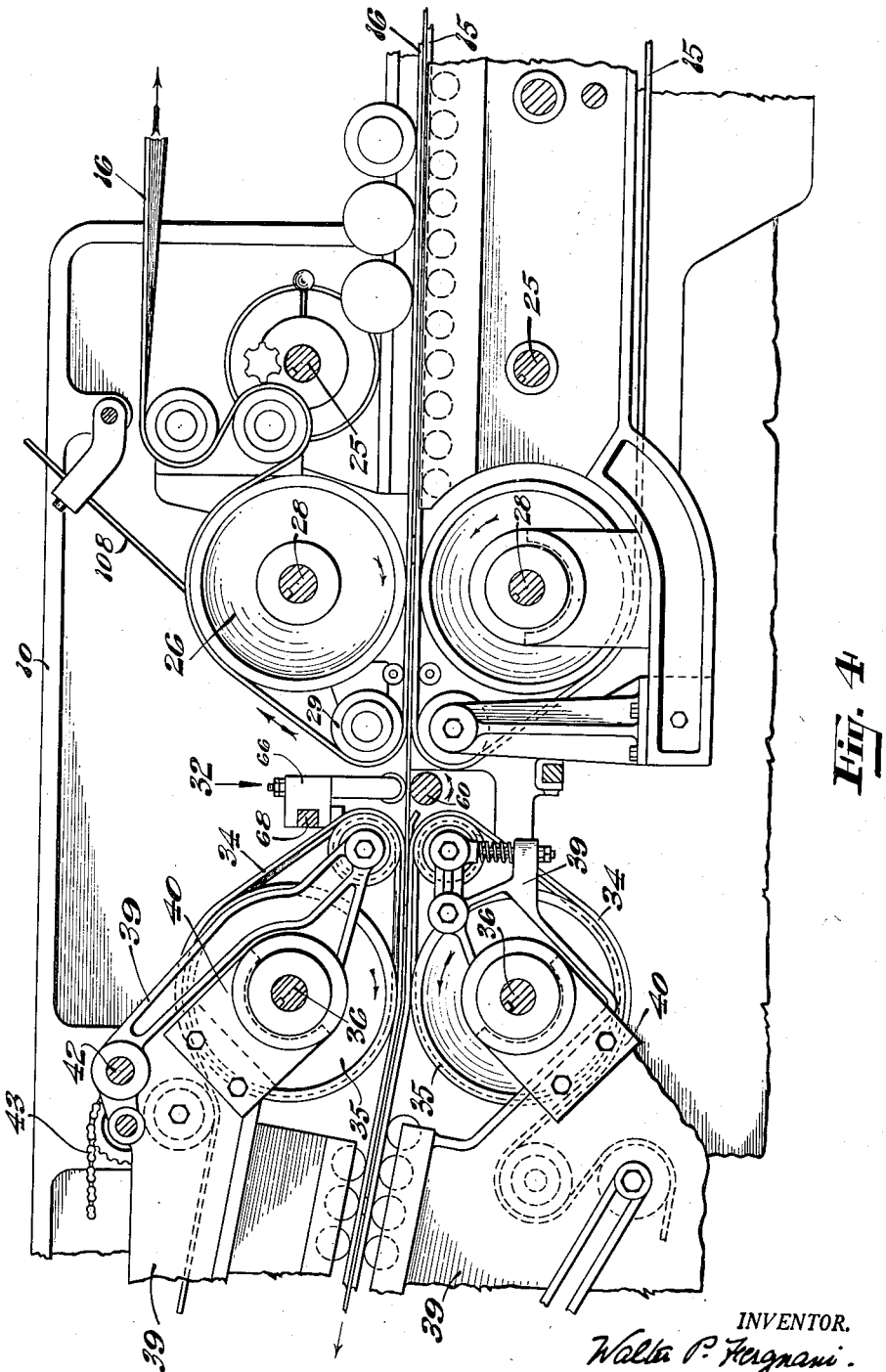

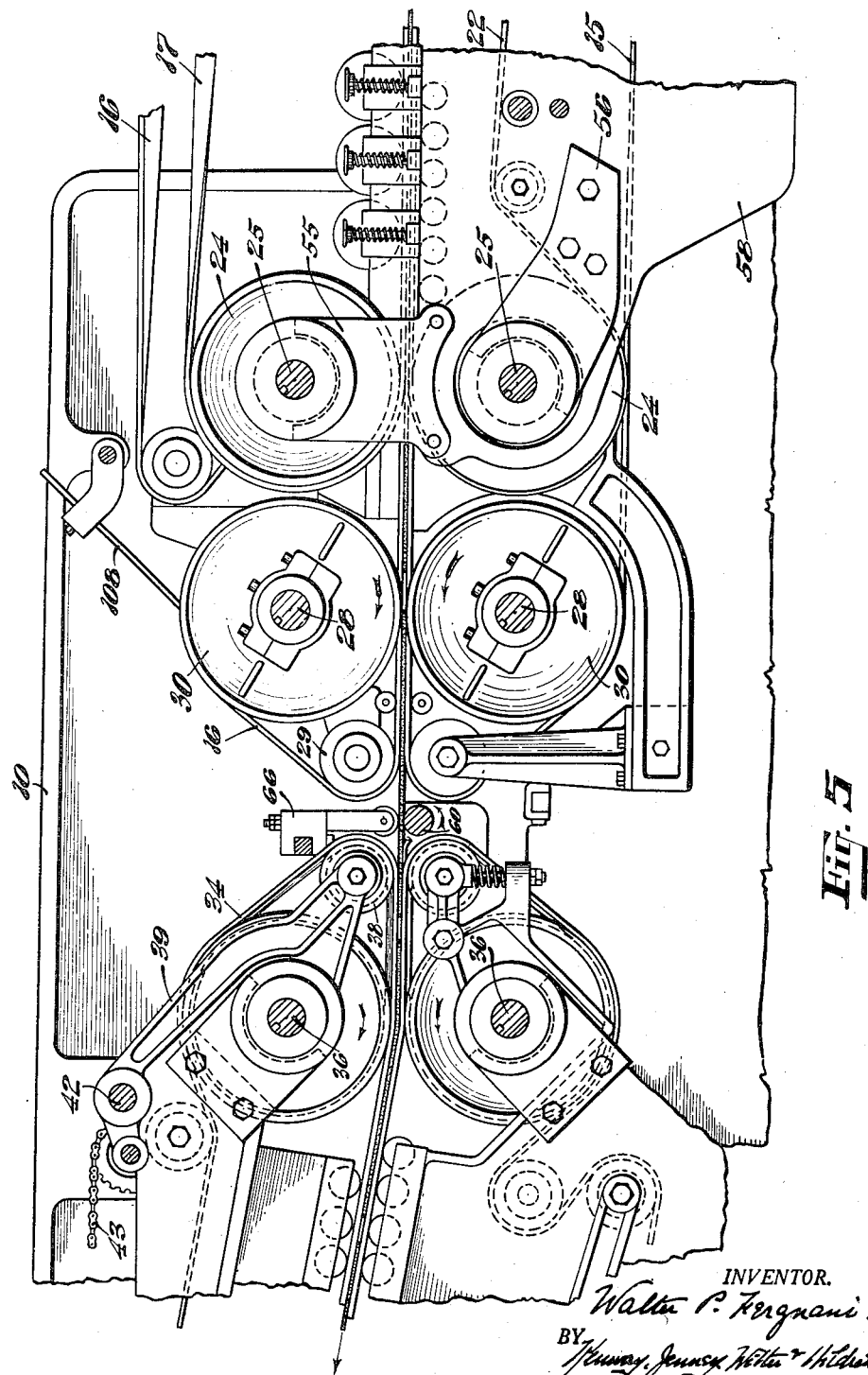

Feb. 5, 1952   W. P. FERGNANI   2,584,855
BOX BLANK FOLDING MACHINE
Filed June 26, 1948   11 Sheets-Sheet 6
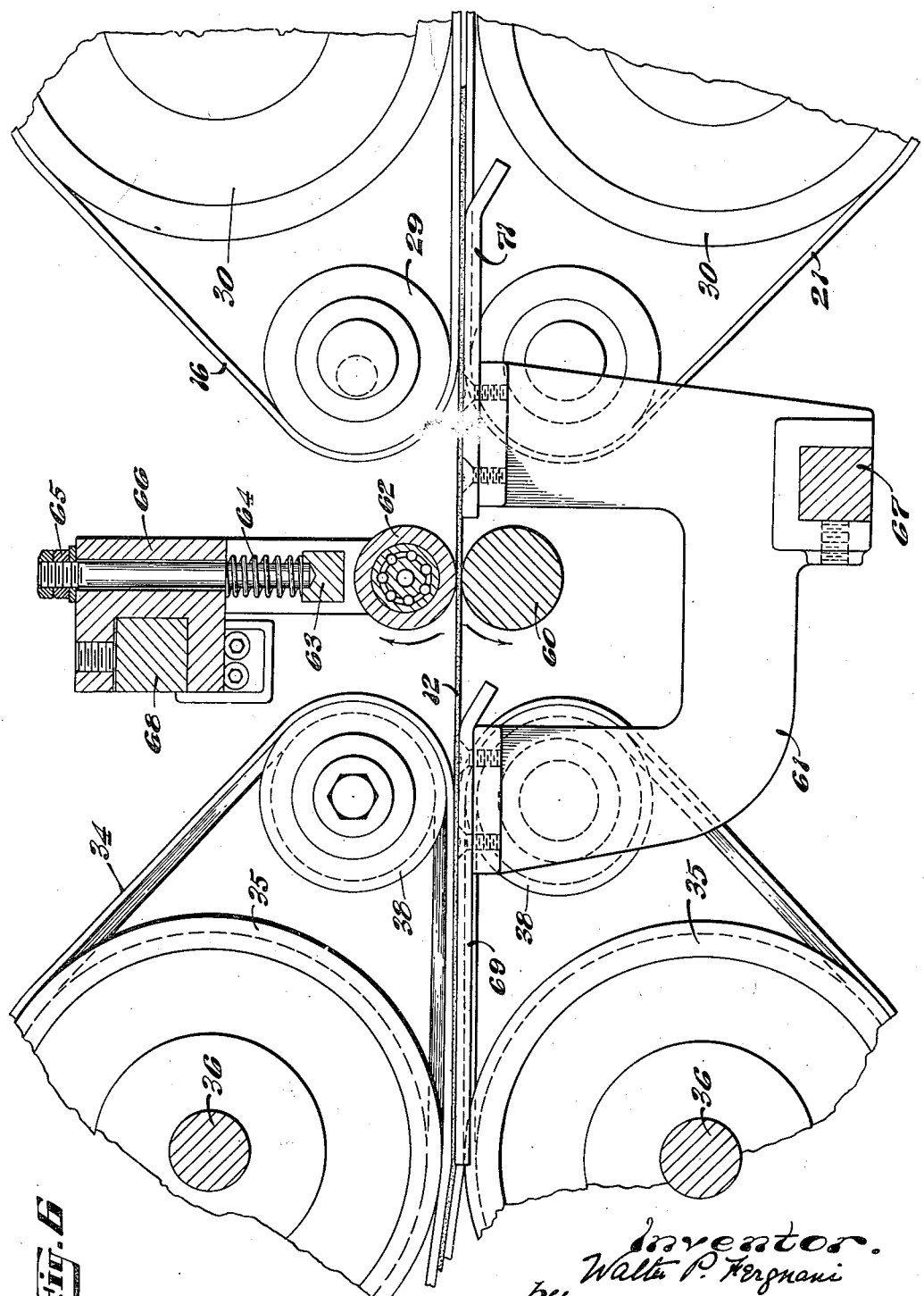

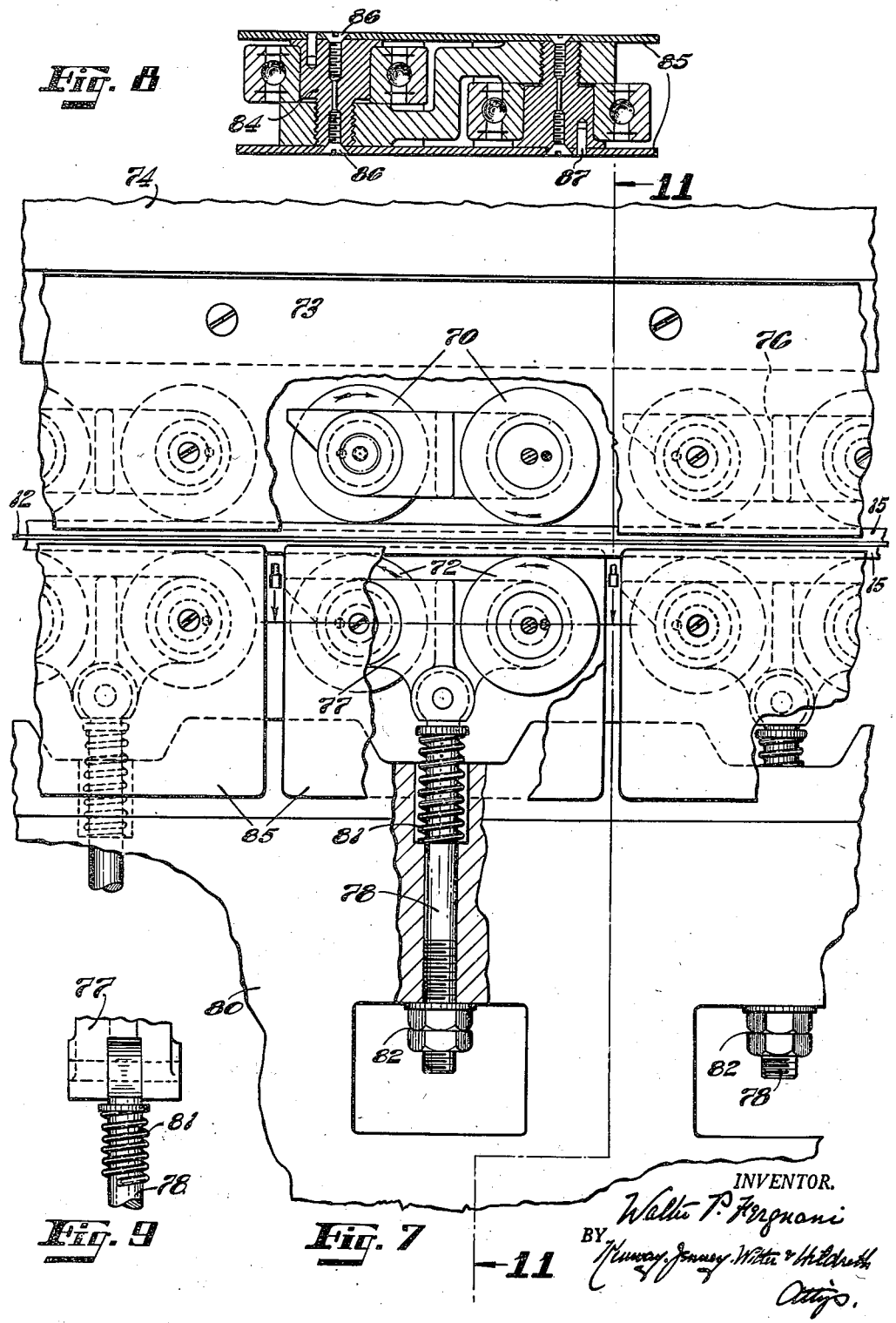

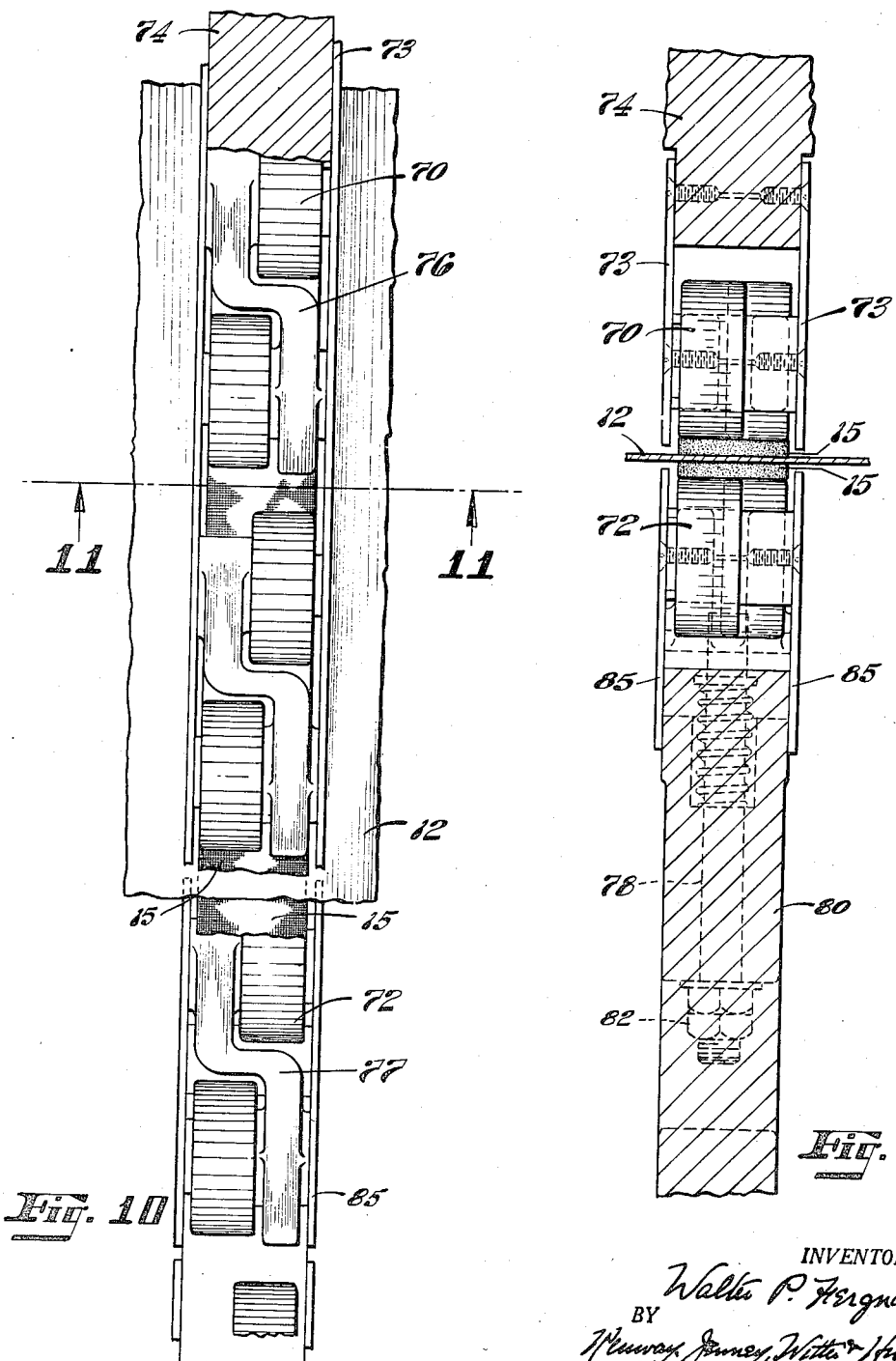

Feb. 5, 1952 W. P. FERGNANI 2,584,855
BOX BLANK FOLDING MACHINE
Filed June 26, 1948 11 Sheets-Sheet 9

INVENTOR.
Walter P. Fergnani
BY

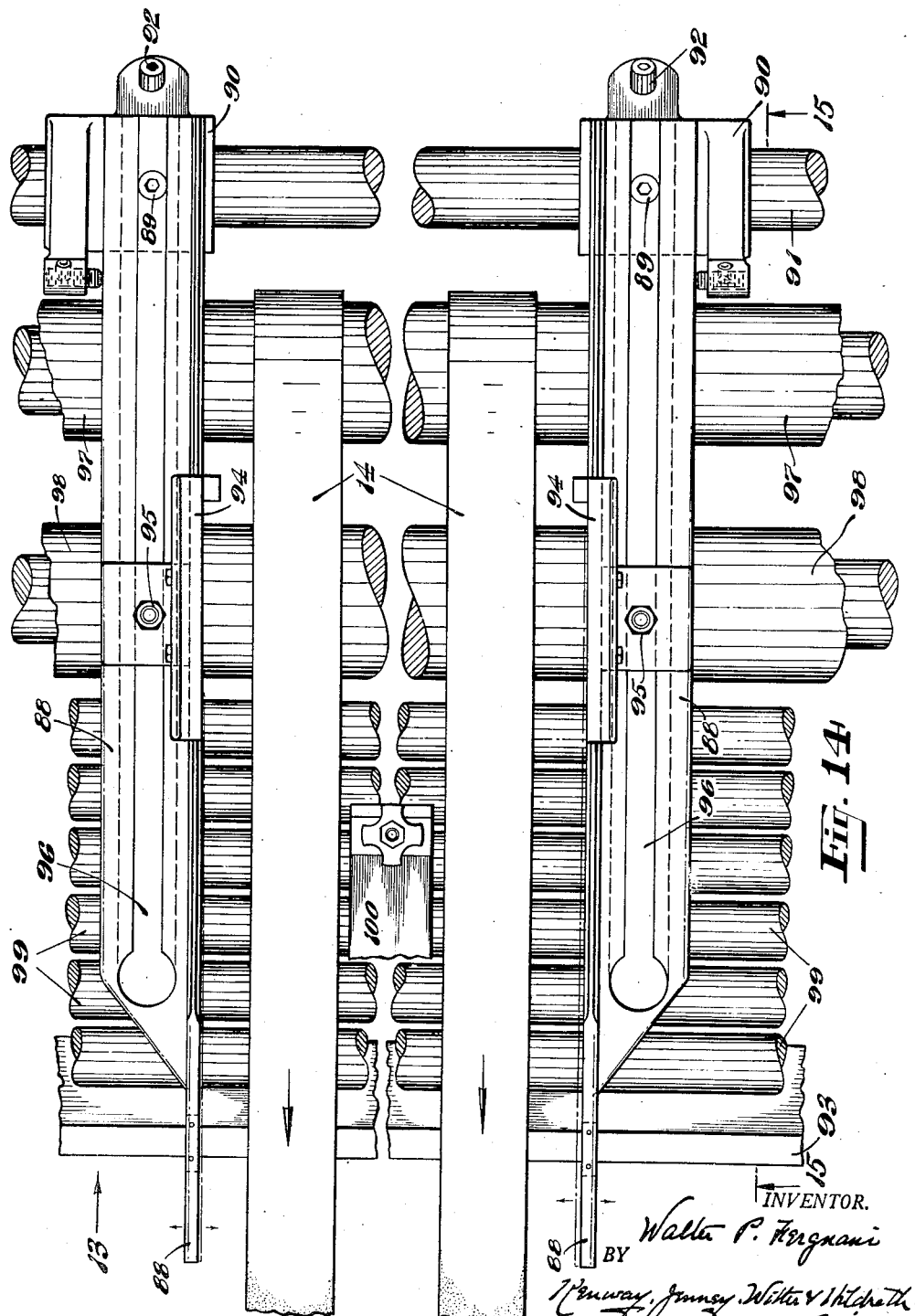

Feb. 5, 1952 W. P. FERGNANI 2,584,855
BOX BLANK FOLDING MACHINE
Filed June 26, 1948 11 Sheets-Sheet 11
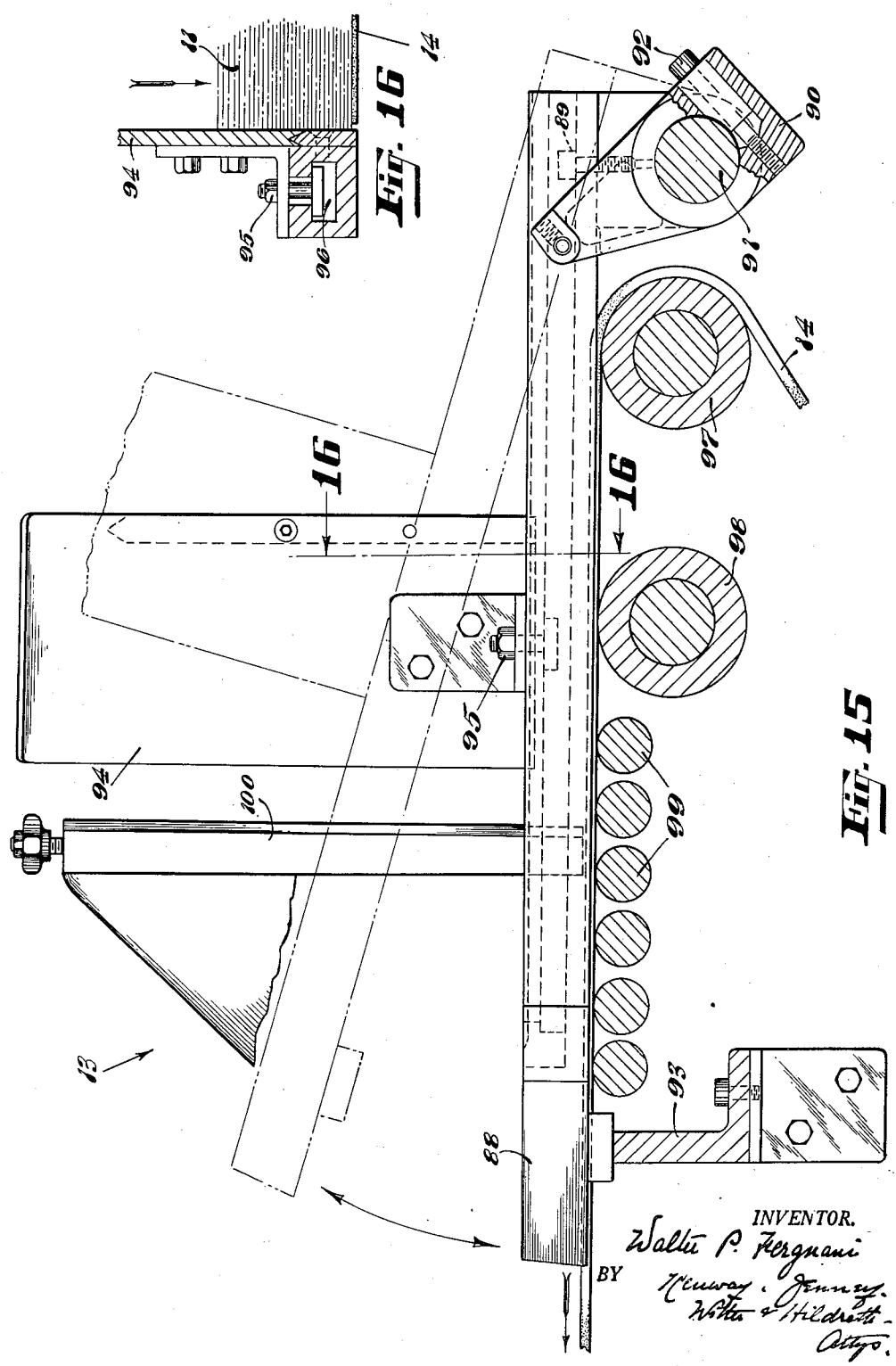
INVENTOR.
Walter P. Fergnani
BY Patented Feb. 5, 1952

2,584,855

UNITED STATES PATENT OFFICE 2,584,855

BOX BLANK FOLDING MACHINE

Walter P. Fergnani, Beverly, Mass., assignor to Post Machinery Company, Beverly, Mass., a corporation of Massachusetts Application June 26, 1948, Serial No. 35,385

10 Claims. (Cl. 93—49)

This invention relates to a machine for feeding flat box blanks successively from a stack to and along a predetermined path and folding the blanks into overlapped and sealed relation during their passage through the machine. The machine is adjustable to handle blanks varying in width and an important feature of the invention relates to an improved magazine for holding the stack of blanks and embodying a model construction and arrangement for conveniently adjusting the magazine to handle blanks of different widths and to feed them with superior accuracy and efficiency.

The machine is constructed to feed flat blanks from the magazine along a predetermined path and automatically to fold the two marginal portions of each blank inwardly into overlapped relation during its travel along the path. The production of a superior product requires the ironing squarely and to flat contour the two fold margins of the blank thus formed and a further feature of the invention embodies novel mechanism for performing this function with an accuracy that produces a box with true square corners and tucks that function to provide uniform and tight end closures. This mechanism includes cooperating pairs of carrier belts for engaging the marginal portions of the folded blank and feeding it along said path. Disposed laterally of the belts, as hereinafter more specifically described, are pressure rolls for engaging the marginal folds of the blanks therebetween and ironing them flat while the blank is properly and firmly supported by the cooperating belts at and along the opposite margin. The production of an improved machine for performing this function comprises a primary object of the invention.

The machine embodies two cooperating pairs of pressure rolls for respectively ironing the two marginal folds of the blank, the pressure rolls being adjustable transversely of the machine for alignment with the folds, and cooperating with each pair of pressure rolls adjacent to the opposite margin of the blank are cooperating carrier belts for holding and feeding the blank through and between the pressure rolls. The blank is fed through the first pressure rolls at one margin by one pair of carrier belts and from thence passes across a gap to the other pair of carried belts which feed it through the second pressure rolls at the other margin. A further improved feature of my invention relates to novel mechanism including transfer rolls disposed at the gap between the two pairs of carrier belts and also preferably including relatively small belt supporting rolls disposed to aid in transferring the blank at the gap and permitting operation of the machine on blanks of relatively small size. My improved feeding and ironing arrangement furthermore permits the use of relatively large ironing rolls with fast surface speed and slow shaft speed, thereby permitting the use of large husky shafts adapted to sustain the high ironing pressures required. The production of an improved mechanism of this nature, hereinafter more specifically described, comprises a further object of the invention.

Blank feeding carrier belts are arranged to engage opposite faces of the blank and a further feature of the invention relates to a novel arrangement of rolls and plates for supporting these belts and holding them in proper alignment. This arrangement includes alternately disposed belt supporting rolls and supporting brackets carried by and between the plates for carrying the rolls and providing uniform and substantial supports for the belts. The invention furthermore incorporates a novel safety switch arrangement for stopping the machine should the blanks become jammed or accumulate in the feeding path.

Figure 13:
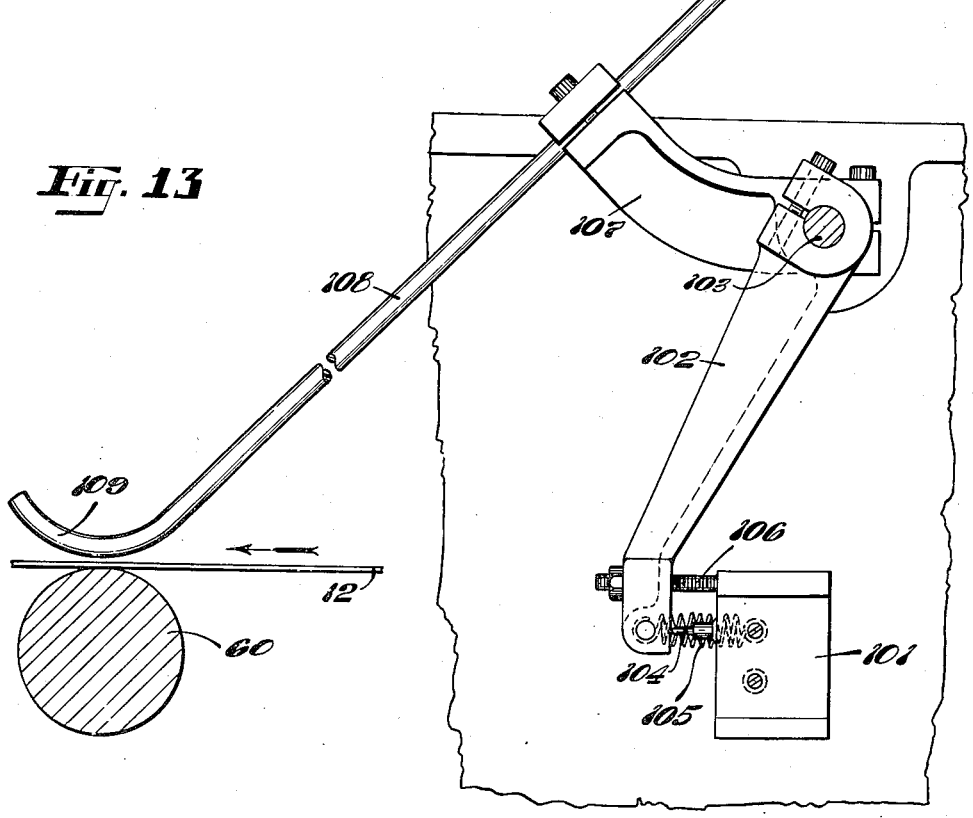

These and other features of the invention will be best understood and appreciated from the following description of a preferred embodiment thereof selected for purposes of illustration and shown in the accompanying drawings in which:

Fig. 1 is a fragmentary perspective view of an intermediate portion of the machine, Fig. 2 is a plan view thereof, Fig. 3 is a sectional side elevation taken on line 3—3 of Fig. 2, Fig. 4 is a like view taken on line 4—4 of Fig. 2, Fig. 5 is a like view taken on line 5—5 of Fig. 2, Fig. 6 is an enlarged view, similar to Fig. 3, of the blank transferring mechanism, Fig. 7 is a fragmentary side elevation of the carrier belt supporting rolls, Fig. 8 is a fragmentary sectional view taken on line 8—8 of Fig. 7, Fig. 9 is a fragmentary view of the lower bracket supporting means, Fig. 10 is a plan view of the bracket supported rolls, Fig. 11 is a sectional view taken on line 11—11 of Figs. 7 and 12, Fig. 12 is a side elevation of the blank carrying belts, Fig. 13 is an enlarged side elevation of the safety stop mechanism shown in Fig. 2, Fig. 14 is a plan view of the blank supporting magazine at the forward end of the machine, Fig. 15 is a sectional side elevation taken on line 15—15 of Fig. 14, and Fig. 16 is a fragmentary sectional view taken on line 16—16 of Fig. 15.

The machine is supported on and disposed between two uprights 10 located at and extending longitudinally along its two opposite sides. A stack 11 of flat blanks 12 to be folded by the machine is supported in a magazine 13 (Figs. 14–16) at the forward end of the machine. The blanks are fed individually and successively from the bottom of the stack to carrier and folding belts which conduct the blanks along a predetermined path through the machine and fold the marginal portions of the blanks inwardly into overlapped relation during their travel along the path.

The magazine includes a plurality of endless belts 14 continuously travelling in the direction of the arrows and on the top reach of which rests the stack 11. The belts 14 feed the bottom blanks individually and successively to a pair of cooperating carrier belts 15 which receive and convey the blanks rearwardly along the predetermined path. During this travel two folding belts 16 and 17, having their bottom reaches disposed beneath the margins of the blanks, operate to fold the two margins upwardly and inwardly, thus forming folds at the two marginal edges 18 of the folded blank. During this travel one margin of the blank is also coated with an adhesive at 20 and the other margin is brought into overlapped relation thereon. Thus, as illustrated in Fig. 2, the folded blank is delivered to my improved mechanism, now to be described, for ironing the margin folds 18.

As shown in Figs. 3 and 5, lower belts 21 and 22 cooperate respectively with the bottom reaches of the folding belts 16 and 17 at the delivery ends of the blank folding path, the cooperating belts being there arranged to engage the blank therebetween along its fold margins and aid in supporting and feeding the folded blank. The belts 17—22 are supported on large upper and lower rolls 24 on two driving shafts 25 and the belts 16—21 are supported on large upper and lower rolls 26 carried by two driving shafts 28 and also on smaller rolls 29 rearwardly of the rolls 26. The belts 16—21 therefore extend rearwardly beyond the belts 17—22 and I mount two relatively large ironing rolls 30 on the shafts 28 laterally of this extended portion of the belts 16—21. The ironing rolls are adjustable on and along the shafts 28 and, as illustrated in Fig. 2, they are adjusted to a position engaging therebetween the margin fold 18 located at the side opposite to the belts 16—21.

It will now be apparent that the flat blanks fed from magazine stack 11 to the carrier belts 15 are adhesively coated and folded into the overlapped relation shown in Fig. 2 during their travel with the belts 15. As illustrated in Fig. 12, the belts 15 comprise a long lower belt with which cooperates a relatively shorter upper belt adjacent to the blank folding end of the magazine. These cooperating belts carry the blanks from the magazine and through the field in which the belts 16 and 17 fold the blanks. Thereafter the cooperating belts 16—21 and 17—22 engage and carry the folded blanks along with the lower belt 15. When each folded blank passes beyond the belts 17—22, and while it remains firmly supported on the lower belt 15 and engaged by and between the belts 16—21, the fold margin 18 previously engaged by the belts 17—22 passes through and is ironed flat by the rolls 30.

From the belts 15 and 16—21, the folded blank, which has been ironed (by rolls 30) at one fold margin, is passed across a gap 32 to a cooperating pair of carrier belts 34 supported at their forward ends on large rolls 35 carried by driving shafts 36 and on smaller rolls 38. The rolls 38 are carried by brackets 39 associated with guide plates 40 attached to brackets 39 and having yoke engagement with the rolls 35. The upper bracket 39 is slidably supported on a transverse rod 42 and the entire upper unit is adjustable along the rod by a screw 44 in threaded engagement with the bracket at 45. The lower unit is likewise adjustable and both screws are operated together by a connecting chain 43. As illustrated in the drawings, the two units supporting the belts 34 are adjusted to a position in which the belts 34 engage the adhesively coated overlap 20 therebetween, thereby serving to receive and feed the blank and firmly compress the overlap. Two ironing rolls 46, like the rolls 30, are mounted on the shafts 36 in position to receive and compress the second fold margin 18 therebetween. Thus the belts 34 serve to support the blank along its entire length while passing it through the rolls 46. The completed blank is thereafter fed outwardly of the machine to a packaging station.

As shown in Fig. 3, the belt 16 is supported in driving contact with a substantial arcuate portion of the upper roll 26 by means of a pair of idler rolls 48 and the belt 21 is likewise held in driving contact with the lower roll 26 by an idler 49. A bracket 50 mounted on a supporting bracket 51 carries the upper roll 29 and has yoke engagement with the upper roll 26. The lower roll 29 is carried by the bracket 51 and a yoke 54 also mounted on the bracket 51 has yoke engagement with the lower roll 26. The unit carrying the belts 16—21 is adjustable transversely of the machine by mechanism similar to that above described in connection with the belts 34. Yokes 55 and 56 (Fig. 5) carried by a supporting bracket 58 have like yoke engagement with the rolls 24 and the unit supporting the belts 17—22 is likewise adjustable transversely of the machine.

It is desirable that the cooperating belts 16—21 (opposite ironing rolls 30) and belts 34 (opposite ironing rolls 46) shall have firm and extensive engagement with the blanks during the ironing of the folds at the margins 18 and the employment of the smaller rolls 29 and 38 in association with the large rolls 26 and 35 serves to maintain the belts in flat engagement with the entire length of the blanks during the ironing operation. Furthermore, when operating on relatively small blanks it is necessary either that the gap 32 shall be substantially narrower than the length of the blank or that additional blank transferring means be provided at the gap. It will be apparent that the employment of the small rolls 29 and 38 permit closer adjustment of the belts to each other at the gap than would be permitted when using larger rolls. In addition thereto I may also employ blank transferring means at the gap. The transferring means illustrated in the drawings (Fig. 6) comprises a driven roll 60 extending entirely across the machine at the gap and disposed directly below the path of the blank. Cooperating with the roll 60 at the other side of the blank is an idler 62 carried on a bracket 63 urged toward the blank by a spring 64. Downward movement of idler is limited by a nut 65. The bracket 63 is mounted on a block 66 on and adjustable along a square rod 68 supported at its ends on the uprights 10. The roll 60 is driven in the direction of the arrow and in cooperation with the idler 62 serves to transfer the blanks across the gap from the belts 15 and 16—21 to the belts 34. A U-shaped bracket 61 adjustably mounted on a square rod 67 provides cooperating blank supports 69 and 71 for the transferring mechanism.

It is essential that the blanks shall be firmly supported during the folding operation (at A, Fig. 12) if the final product is to be square and of true uniform shape. The following described novel mechanism is provided for so supporting the cooperating inner reaches of the carrier belts 15 that they will thus firmly engage and support the blanks therebetween during travel through the folding field A. Disposed above and below these reaches are a series of supporting rolls 70 and 72 respectively supporting the two belts at the outer faces of their inner reaches. The upper rolls 70 are carried by and between a pair of sheet metal plates 73 attached to and depending from a supporting plate 74. The rolls are supported in pairs on brackets 76. Each bracket 76 is of the shape illustrated in Fig. 10 and supports a roll at each of its two opposite sides. The rolls are in staggered relation, slightly overlap at their inner margins and are of a combined width substantially equal to that of the belt.

The rolls 72 are supported in like manner in pairs on brackets 77 each pivotally carried on the top end of a rod 78 mounted for vertical longitudinal movement in a supporting plate 80. A compression spring 81 normally lifts the bracket upwardly to a position limited by check nuts 82. The rolls are of ball bearing construction and each is supported on the larger end of a stud 84 having its other end threaded into the bracket. A pair of sheet metal plates 85 is carried by each bracket 77 and secured by screws 86 threaded into the ends of the studs. Pins 87 prevent rotation of the studs. The plates 85 and 73 are so relatively positioned that they overlap the edges of the belts 15 when the rolls are in contact with the belts.

The adjusted and spring pressed bottom rolls 72 in cooperation with the top rolls 70 are adapted to give firm and continuous support to the blank carrying reaches of the belts 15 throughout the blank folding field A. It will be furthermore apparent that the overlapping rolls give support to the belt across its entire width and that the novel supporting of the rolls on the studs 84, in turn supported in the brackets between the side plates, provides very compact and substantial belt supporting units. The nuts 82 can be adjusted to a degree giving the desired support to the bottom belt and the required gripping effect on the blanks.

The blank supporting magazine 13 is located at the front end of the machine and comprises two side bars 88 each supported for lateral pivotal movement on and about a stud 89 securing the front ends of the bars to a clamp bracket 90 rotatably adjustable on a rod 91. Screws 92 are provided for clamping the brackets to the rod. The free ends of the bars 88 are adapted to rest on a cross bar 93 of the frame. A blank supporting hopper plate 94 is supported by a bolt 95 adjustable in a slot 96 extending along each bar. The forward end loops of the belts 14 are supported on a roll 97 and the top reaches of the belts ride on rolls 98 and 99. The belts are adapted to feed the bottom blank of the stack through a gap at the bottom end of an abutment 100 to the carrier belts 15.

It will be apparent that the bars 88 can be adjusted laterally to a spacing to accommodate blanks of different widths. It is necessary during such adjustment to vary the position of the belts 14 relative to the bars and to pass the bars over the belts. My novel arrangement of the bars on the rod 91 beyond the roll 97 permits such adjustment merely by pivoting the bars upwardly to clear the belts, thus considerably simplifying these adjustments. Furthermore it is frequently desirable to place the bars in a non-parallel position at somewhat narrow width at their free inner ends whereby accurately to center the blank as it is fed from the stack to the machine. The pivotal mounting of the bars on the studs 89 provides a convenient adjustment for this purpose.

A further feature of the invention, illustrated in Figs. 2 and 13, comprises mechanism for automatically stopping the machine should the blanks become jammed or accumulate in the feeding path. The machine is under the control of a normally open micro-switch 101 (Fig. 13). An arm 102 fixed to a transverse shaft 103 has its free end overlying the contact pin 104 extending outwardly from the switch. A tension spring 105 connected to the free end of the arm normally draws the arm into contact with the pin to an extent permitted by an adjusting screw 106 to close and hold the switch closed.

A second arm 107 fixed to the shaft 103 carries a rod 108 extending downwardly to and having a curved end 109 disposed above the roll 60. Normal passing of the blanks 12 beneath the end 109 of the rod does not lift the rod sufficiently to permit the switch to open but should the blanks become jammed or accumulated in the feeding path they will lift the rod 108, rotate the shaft 103 and move the arm 102 outwardly a sufficient amount to allow the switch to open and stop the machine. Thus, if a jam should occur, the arm 102 will be pivoted in a direction away from the micro-switch, thereby obviating the possibility of damage to the switch or machine.

Having thus disclosed my invention, what I claim as new and desire to secure by Letters Patent is:

1. A box blank folding machine comprising a pair of carrier belts having opposed reaches for engaging one longitudinal margin of a blank therebetween and feeding it longitudinally along a predetermined path parallel with the reaches with the opposite longitudinal margin of the blank extending laterally beyond said reaches, and a pair of pressure rolls disposed laterally of said reaches and respectively in position to engage opposite faces of and compress the blank at said opposite longitudinal margin while the blank is supported and fed by said reaches.

2. A box blank folding machine comprising two pairs of carrier belts respectively at opposite margins of a predetermined path, each pair of belts having opposed reaches for engaging one longitudinal margin of a blank therebetween and feeding it longitudinally along said path parallel with the reaches, the delivery end of one of said pairs of belts having a blank engaging reach portion extending beyond the other pair, and a pair of pressure rolls disposed laterally of said reach portion at the opposite margin, the pressure rolls being respectively in position to engage opposite faces of and compress the blank at said opposite margin as the blank is supported and fed by the extended portion of the reaches.

3. The machine defined in claim 2 plus a pair of carrier belts having blank engaging reaches disposed beyond and in position to receive the blank from said pressure rolls, and a pair of pressure rolls disposed laterally of the last named reaches and in position to engage and compress said longitudinal margin of the blank as the blank is supported and fed by said last named reaches.

4. A box blank folding machine comprising a pair of carrier belts having opposed reaches for engaging one longitudinal margin of a blank therebetween and feeding it longitudinally along a predetermined path parallel with the reaches, two relatively large belt supporting wheels at opposite faces of the reaches adjacent to their delivery end, two relatively small wheels supporting the delivery end loops of the belts, said large and smaller wheels engaging and supporting the delivery reaches of the belts in said path, and rolls for supporting the return reaches of the belts in substantial driving contact with the large wheels.

5. The machine defined in claim 4 plus a pair of pressure rolls disposed laterally of said large and small wheels and respectively in position to engage opposite faces of and compress a fold in the blank at the opposite longitudinal margin as the blank is supported and fed by said reaches.

6. The machine defined in claim 5 plus a pair of carrier belts like the first named belts and supported in like manner by large and small wheels and providing blank engaging reaches disposed in position to receive a blank from the first named belts, and a pair of pressure rolls disposed laterally of the last named reaches and in position to engage and compress a fold in said longitudinal margin of the blank as the blank is supported and fed by said last named reaches.

7. A box blank folding machine comprising a pair of carrier belts having opposed reaches for engaging one longitudinal margin of a blank therebetween and feeding it longitudinally along a predetermined path parallel with the reaches, wheels comprising a cooperating pair of small wheels and a pair of larger wheels rearwardly thereof for supporting the delivery end loops of the belts, a second pair of carrier belts having blank engaging reaches disposed beyond and in position to receive the blank from the first named reaches, wheels comprising a cooperating pair of small wheels and a pair of larger wheels rearwardly thereof spaced a predetermined gap distance from the first named wheels and supporting the entry end loops of the second named belts, and a driven roll and a cooperating roll in said gap in position to receive therebetween and feed a blank from the first named belts to the second named belts.

8. A box blank feeding machine comprising a pair of carrier belts having opposed reaches for engaging a blank therebetween and feeding it longitudinally along a predetermined path parallel with the reaches, two relatively large belt supporting wheels at opposite faces of the reaches adjacent to their delivery end, two relatively small wheels supporting the delivery end loops of the belts, said large and smaller wheels engaging and supporting the delivery reaches of the belts in said path, rolls for supporting the return reaches of the belts in substantial driving contact with the large wheels, and a second pair of carrier belts like the first named belts and supported in like manner by large and small wheels similarly arranged with the small wheels supporting the entry end loops of the second named belts and providing blank engaging reaches disposed in position to receive a blank from the first named belts.

9. A box blank folding machine comprising a pair of carrier belts having opposed reaches for engaging a blank therebetween and feeding it along a predetermined path parallel with the reaches, means including two parallel shafts supporting cooperating end loops of the belts, and a pair of cooperating pressure rollers on the shafts laterally of the belts for engaging opposite faces of and compressing the blank while the blank is supported and fed by said reaches.

10. A box blank folding machine comprising a pair of carrier belts having opposed reaches for engaging a blank therebetween and feeding it along a predetermined path parallel with the reaches, a second pair of like belts arranged to receive a blank fed from the first belts across a gap therebetween, a long driven roller disposed below the blank path in the gap, a bar parallel with the roller above the path, a carriage adjustable along the bar, and a spring-pressed idler roll carried by the carriage and cooperating with the driven roller to grip a blank therebetween.

WALTER P. FERGNANI.

REFERENCES CITED

The following references are of record in the file of this patent:

UNITED STATES PATENTS

| Number | Name | Date |
|---|---|---|
| 833,329 | Low | Oct. 16, 1906 |
| 1,011,820 | Labombarde | Dec. 12, 1911 |
| 1,096,633 | Labombarde | May 12, 1914 |
| 1,097,641 | Jagenberg | May 26, 1914 |
| 1,298,586 | Sidebotham | Mar. 25, 1919 |
| 1,572,438 | La Bombarde et al. | Feb. 9, 1926 |
| 1,864,231 | Canning | June 21, 1932 |
| 2,108,334 | Hayes | Feb. 15, 1938 |
| 2,252,626 | Goldbeck | Aug. 12, 1941 |
| 2,302,060 | Ryan | Nov. 17, 1942 |
| 2,370,187 | Pecky | Feb. 27, 1945 |
| 2,410,611 | Pratt et al. | Nov. 5, 1946 |